US011562435B2

United States Patent
Perl et al.

(10) Patent No.: US 11,562,435 B2
(45) Date of Patent: Jan. 24, 2023

(54) APPARATUS FOR A DYNAMIC, SCORE-BASED, TELEMATICS CONNECTION SEARCH ENGINE AND AGGREGATOR AND CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Donato Genovese, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 590 days.

(21) Appl. No.: 15/421,010

(22) Filed: Jan. 31, 2017

(65) Prior Publication Data

US 2018/0025430 A1 Jan. 25, 2018

Related U.S. Application Data

(63) Continuation of application No. PCT/EP2016/067619, filed on Jul. 25, 2016.

(51) Int. Cl.
*G06Q 40/08* (2012.01)
*G06F 16/9537* (2019.01)
(Continued)

(52) U.S. Cl.
CPC ......... *G06Q 40/08* (2013.01); *B60R 16/0231* (2013.01); *G01C 21/3697* (2013.01);
(Continued)

(58) Field of Classification Search
USPC .......................................................... 705/4
See application file for complete search history.

(56) References Cited

U.S. PATENT DOCUMENTS

| 7,783,673 B2 * | 8/2010 | Schneider | G06Q 40/08 |
| | | | 340/601 |
| 7,831,451 B1 * | 11/2010 | Morse | G06Q 10/10 |
| | | | 705/4 |

(Continued)

FOREIGN PATENT DOCUMENTS

WO WO-2016028228 A1 * 2/2016 ............. G06Q 40/08

OTHER PUBLICATIONS

Litman, Todd. "Pay-As-You-Drive Pricing and Insurance Regulatory Objectives." Journal of Insurance Regulation 23.3 (2005). (Year: 2005).*

*Primary Examiner* — Clifford B Madamba
*Assistant Examiner* — Claire A Rutiser
(74) *Attorney, Agent, or Firm* — Oblon, McClelland, Maier & Neustadt, L.L.P.

(57) ABSTRACT

Proposed is a mobile automotive car system, and method thereof, for a dynamic, telematics-based connection search engine and telematics data aggregator, wherein risk-transfer profiles are captured and categorized in a results list from a plurality of first risk-transfer systems based on dynamically generated driving score parameters by means of appropriately triggered automotive data. As a variant, during a predefined trial period, the automotive and driving behavior data can be collected, which are transmitted together with the generated driving score parameters to multiple automated first risk-transfer systems for quotation. The user is able to dynamically select the best-fitting first risk-transfer system for risk-transfer by means of the results list, which is provided and updated in real-time for display to and selection by a user of a mobile telecommunication apparatus by means of a mobile telematics application of the mobile telecommunications apparatus.

29 Claims, 5 Drawing Sheets

(51) Int. Cl.
*G06F 16/2457* (2019.01)
*B60R 16/023* (2006.01)
*G01C 21/36* (2006.01)
*G07C 5/00* (2006.01)
*H04W 4/80* (2018.01)
*G01S 19/13* (2010.01)

(52) U.S. Cl.
CPC .... *G06F 16/24578* (2019.01); *G06F 16/9537* (2019.01); *G07C 5/008* (2013.01); *G01S 19/13* (2013.01); *H04W 4/80* (2018.02)

(56) References Cited

U.S. PATENT DOCUMENTS

| | | | | |
|---|---|---|---|---|
| 8,515,783 | B1* | 8/2013 | Weeks | G06Q 40/08 705/4 |
| 8,595,034 | B2* | 11/2013 | Bauer | G06Q 40/02 434/322 |
| 9,619,203 | B2* | 4/2017 | Tamir | G06Q 30/0283 |
| 10,783,587 | B1* | 9/2020 | Augustine | G07C 5/00 |
| 2003/0014342 | A1* | 1/2003 | Vande Pol | G06Q 20/102 705/36 R |
| 2010/0131304 | A1* | 5/2010 | Collopy | G06Q 30/0251 705/4 |
| 2011/0112870 | A1* | 5/2011 | Berg | G06Q 40/08 705/4 |
| 2011/0153367 | A1* | 6/2011 | Amigo | G06Q 40/08 705/4 |
| 2011/0213628 | A1* | 9/2011 | Peak | G06Q 40/08 705/4 |
| 2012/0036038 | A1* | 2/2012 | Farmer | G06Q 30/0204 705/26.7 |
| 2012/0123806 | A1* | 5/2012 | Schumann, Jr. | G08G 1/096775 705/4 |
| 2012/0179493 | A1* | 7/2012 | Giordano | G06Q 40/08 705/4 |
| 2012/0259666 | A1* | 10/2012 | Collopy | G06Q 30/0269 705/14.63 |
| 2013/0226624 | A1* | 8/2013 | Blessman | G06Q 40/08 705/4 |
| 2014/0032089 | A1* | 1/2014 | Aoude | G08G 1/166 701/117 |
| 2014/0046701 | A1* | 2/2014 | Steinberg | G06Q 40/08 705/4 |
| 2015/0019262 | A1* | 1/2015 | Du | G06Q 40/08 705/4 |
| 2015/0294422 | A1* | 10/2015 | Carver | G06Q 40/08 705/4 |
| 2016/0171521 | A1* | 6/2016 | Ramirez | G06Q 30/0224 701/409 |
| 2016/0171618 | A1* | 6/2016 | Besman | G06Q 40/08 705/4 |

\* cited by examiner

APPARATUS FOR A DYNAMIC, SCORE-BASED, TELEMATICS CONNECTION SEARCH ENGINE AND AGGREGATOR AND CORRESPONDING METHOD THEREOF

CROSS-REFERENCE TO RELATED APPLICATIONS

This application is a continuation application of PCT International Application No. PCT/EP2016/067619 filed Jul. 25, 2016.

FIELD OF THE INVENTION

The present invention relates to mobile real-time systems reacting dynamically to captured environmental or operational parameters, in particular to automotive system's monitoring, capturing and reacting to automotive parameters of motor vehicles during operation. The present invention further relates to telematics based automated risk-transfer, alert and real-time notification systems for motor vehicles and wireless technology used in the context of telematics. Finally, the invention also relates to telematics-based real-time expert systems. The term telematics, in particular traffic telematics, refers to systems that are used for communications, instrumentation and control, and information technology in the field of transportation. Thus, the present invention relates to the use of telematics together with real-time risk-monitoring, automated risk-transfer and insurance systems based on captured and measured usage-based and/or user-based telematics data.

BACKGROUND OF THE INVENTION

Modern automotive engineered car driving (including completely manually controlled driving, partially autonomous car driving, driverless cars, self-driving cars, robotic cars) is associated with vehicles that are capable of sensing their environment and operational status or use. At the same time, the use of sensors in cellular mobile phones, in particular in so called "smart phones", has strongly increased in recent years, making it possible to monitor or time-dependent track the operation mode of the smart phone as well as surroundings, use or even behavior of the user. Modern, mobile smart phones comprise touchscreens, accelerometers, gyroscopes, GPS, cameras, microphones etc., allowing to capture a vast mixture of contextual parameters during the use of the mobile device. At the same time, modern automotive engineered vehicles are capable of detecting a wide variety of operational or surrounding parameters using for example radar, LIDAR (measuring device to measure distances by means of laser light), GPS (Global Positioning System), odometry (measuring device for measuring changings in position over time by means of using motion sensor data), and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity into a signal that can be read by an observer or by another instrument, circuit or system. Commonly used sensors for automotive motor vehicle or mobile cell phones are for example infrared sensors containing an infrared emitter, and an infrared detector, for example used with touchless switches, passive infrared (PIR) sensors reacting and detecting only on ambient IR such as motion sensors, speed detectors e.g. radar guns such as microwave radars using the Doppler effect (the return echo from a moving object will be frequency shifted) or IR/Laser radars sending pulses of light for determining the difference in reflection time between consecutive pulses to determine speed, ultrasonic sensors emitting a sound and detecting the echo to determine range, accelerometers measuring the rate of change of the capacitance and translating it into an acceleration by means of a proof mass, gyroscopes measuring a mass oscillating back and forth along the first axis, and plates on either side of the mass in the third direction where the capacitance changes when a rotation is detected around the second direction, IMU-sensors (Inertial Measurement Unit) providing a sensor with a full 6-degrees of freedom by using a combination of accelerometer and gyroscope, force sensing resistor e.g. for contact sensing, touchscreens based on resistive, capacitive or surface acoustic wave sensing, location sensors such as GPS (Global Positioning System), triangulation or cell identification systems, visual sensors such as cameras and computer visions, SIM-based or RFID-based (Radio-Frequency Identification) sensors, or environment sensors as moisture sensors, humidity sensors, temperature sensors etc.

The development of device and user monitoring above outlined, also referred to telematics, is mirrored, in the electronic, telecommunication and insurance industries, by a fast technological development of similar or even consistent technical strategies and components to improve the effectiveness of interactions with customers. Social networking, telematics, service-oriented architectures (SOA) and usage-based services (UBS) are all interacting and pushing this development. Social platforms, such as Facebook, Twitter and YouTube, offer the ability to improve customer interactions and communicate product information. However, the field of telematics is larger still, as it introduces entirely new possibilities that align the technical input requirements and problem specifications of dynamic risk-transfer, technology and mobility. SOA and telematics are becoming key to manage the complexity of integrating known technologies and new applications. Technically, telematics being a composite of telecommunications and information technology, it is an interdisciplinary technical term encompassing telecommunications, vehicular technologies, road transportation, road safety, electrical engineering (sensors, instrumentation, wireless communications, etc.), and information technology (multimedia, Internet, etc.). Thus, the technical fields of mobile parameters detection, data aggregation or telematics are affected by a wide range of technologies such as the technology of sending, receiving and storing information via telecommunications devices in conjunction with controlling remote objects, the integrated use of telecommunications and informatics for application in vehicles and for example with control of moving vehicles, GNSS (Global Navigation Satellite System) technology integrated with computers and mobile communications technology in automotive navigation systems. The use of such technology together with road vehicles is also called vehicle telematics. In particular, telematics triggers the integration of mobile communications, vehicle monitoring systems and location technology by allowing a new way of capturing and monitoring real-time data. Usage-based risk-transfer systems, as for example provided by the so-called Snapshot technology of the firm Progressive, link risk-transfer compensation or premiums to monitored driving behavior and usage information gathered by an in-car "telematics" device. In the past five years, telematics devices have shown expanded use by a factor of 10 to 100 in cars. On such a broadened platform, telematics devices and systems may help to increase safety and improve driving behavior.

Vehicle telematics refers to installing or embedding telecommunications devices mostly in mobile units, such as cars or other vehicles, to transmit real-time driving data, which for example can be used by third parties' system, such as automated risk-monitoring and risk-transfer systems, providing the needed input needed for instance to measure the quality and risks of individual drivers. The telematics instruments for such changes are available in the state of the art. Vehicle tracking and global positioning satellite system (GPS) technologies are becoming commonplace, as are the telecommunications devices that allow us to be connected from almost anywhere. In particular, dynamically monitored and adapted risk-transfer could be imaginable by interconnecting telematics with other real-time measuring systems. Advantages provided by such systems could for example mean that after being involved into a car accident, emergency and road services could be automatically activated, vehicle damage assessed, and the nearest repair shop contacted. In summary, the customer experience could be transformed beyond traditional operability of risk-transfer systems and insurance coverage to real-time navigation and monitoring, including the automated activation of concierge service, safe driving tips, video-on-demand for the kids in the backseat, in-car or online feedback, and real-time vehicle diagnostics.

In addition to real-time surveillance, it bears mentioning that an insurance agent may want to exchange information with a customer associated with the insurer for a number of different reasons. However, the information exchange between the customer and the insurer and/or the insurer and the reinsurer is still largely cumbersome and time-consuming, and the risk-transfers provided by such structures thus typically remain static within a fixed agreed upon time period. For example, an existing or potential consumer may access an insurance agent's web page to determine a yearly or monthly cost of an insurance policy (e.g., hoping to save money or increase a level of protection by selecting a new insurance company). The consumer may provide basic information to the insurance agent (e.g. name, business type, date of birth, occupation, etc.), and the insurance agent may use this information to request a premium quote from the insurer. In some cases, the insurer will simply respond to the insurance agent with a premium quote. In other cases, however, an underwriter associated with the insurer will ask the insurance agent to provide additional information so that an appropriate premium quote can be generated. For example, an underwriter might ask the insurance agent to indicate how often, where and at which time a motor vehicle is primarily used or other data such as the age of the motor vehicle and its indented use (transportation etc.). Only after such additional information is determined, may an appropriate risk analysis can be performed by the insurer to process an adapted underwriting decision, and/or premium pricing.

Integrated telematics technologies may offer new technological fields, in particular in monitoring and steering by means of centralized expert systems, in risk-transfer technology, for example, where this may take the form of far more accurate and profitable pricing models provided by such automated expert systems. This would create a huge advantage, in particular for real-time and/or usage-based and/or dynamically operated systems. The advantage of such telematics systems is not restricted to risk transfer but also includes advantages, for example, in fleets' management that monitor employees' driving behavior via telematics to improve asset utilization, reduce fuel consumption and improve safety, etc. Other fields may also benefit from such integrated telematics systems, as state and local governments strive striving to improve fuel consumption, emissions and highway safety. Some states, for example, recently issued dynamic pay-as-you-drive (PAYD) regulations, which also on the other side allows insurers to offer drivers insurance rates based on actual versus estimated miles driven. It is a financial incentive to drive less.

Telematics technology already provides the above-mentioned features such as an accelerometer making it possible to assess drivers' style and behavior, thus expanding the risk factors normally tracked from the current 40 to more than 100. As demand for accelerometers has increased, automakers and device manufacturers have been able to push down the unit cost. The need for increased connectivity and access (driven by the "always-connected" consumer) will allow additional device applications. It bears mentioning that most technologies in the telematics ecosystem are not unique to vehicle's insurance. Social listening, neighborhood protection portals and home monitoring have an impact on how home and property insurance risks are assessed. Further, monitoring systems are available to adjust home temperature controls or automatically dispatch service providers should there be a water, heat or air-conditioning issue in a home. Also, telematics technologies are being developed for healthcare and senior living products, including location-based alerts, health-monitoring, and family-tracking services that may be used for how individual risk is assessed, allowing optimized risk-transfer in the life risk-transfer field. Examples also include robotic nurse's aides designed to remind the elderly about routine activities, which also guides them through their homes and calls for help in case of emergencies. These sorts of applications will continue to evolve as technology becomes more reliable and cost effective and as the need for such solutions increases in the elderly and home care sectors.

Telematics technology, used according to the present invention, may also provide the basis technology for Service-oriented architectures (SOAs) or usage-based and/or user-based applications. Both are considered to be among the most promising of today's technologies. SOAs allow companies to make their applications and computing resources (such as customer databases and supplier catalogs) available on an as-needed basis, either via an intranet or the Internet. Based on a plug-and-play concept, SOA provides reusable software components across multiple technology platforms. It offers a new approach to software deployment while also tackling serious problems, such as complexity and ineffective data integration. This approach provides a consistent technology making it easier to access data and integrate both new and old content. Information and services are centralized and reusable, shortening development times and reducing maintenance costs. When a software service is needed (such as retrieving customer information) the user or system sends a request to a directory, which determines the proper service name, location and required format, and then sends back the desired output (in this case, customer information). Users and other applications do not need to know the internal workings of the data handling or processing, nor do organizations need to own and maintain software; they simply access the appropriate service over the Internet or network, or another data transmission network.

However, telematics technology, as used in the way of the present invention, may also provide the basis technology for other platforms, as e.g. IoT-platforms (Internet of Things), which provide the network of physical devices, vehicles, buildings and/or other items embedded with electronics, software sensors, actuators, and network connectivity that enables these objects to collect and exchange data. In particular, IoT allows objects to be sensed and controlled remotely across existing network infrastructure, also allowing for a more direct integration of the physical world into processor-driven systems and computer means. This integration results in improved efficiency, accuracy and economic benefit, When IoT comprises sensors and actuators, the technology becomes a more general system-class of cyber-physical systems, which may encompass technologies as smart grids, smart homes, intelligent transportations, and smart cities. In IoT, each thing is uniquely identifiable through its embedded computer system, and is also able to interoperate with the existing Internet infrastructure. IoT provides advanced connectivity of devices, systems, and services that goes beyond machine-to-machine (M2M) communications and covers a variety of protocols, domains, and applications. There are incorporated herein by reference. The interconnection of these embedded devices (including smart objects), is applicable in automation in nearly all fields, while also enabling advanced applications like a smart grid, and smart cities. Things in IoT refer to a wide variety of devices but in particular to automobiles with built-in sensors, analysis devices for environmental monitoring or field operation devices that can assist car drivers e.g. in search and rescue operations. Thus, things in IoT can comprise a mixture of hardware, software, data and/or service. Such devices collect useful data with the help of various existing technologies and then autonomously flow the data between other devices. Current examples include the numerous prototype autonomous or half-autonomous vehicles currently developed, including Mercedes-Benz, General Motors, Continental Automotive Systems, IAV, Autoliv Inc., Bosch, Nissan, Renault, Toyota, Audi, Volvo, Tesla Motors, Peugeot, AKKA Technologies, Vislab from University of Parma, Oxford University and Google, for example, using interconnected telematics devices with appropriate network technology for control, monitoring, operating and steering of the half or fully automated vehicles.

SUMMARY OF THE INVENTION

It is one object of the present invention to provide a mobile automotive system reacting dynamically, in real-time, to captured environmental or operational parameters of motor vehicles during operation, in particular to measuring parameters of automotive systems, allowing a user to adapt the vehicle's operation or driving risks dynamically and in real-time by means of an automated risk-transfer engine making it possible to select appropriate risk-transfer profiles dynamically based on monitoring, capturing and reacting to automotive parameters of motor vehicles during operation. Further, it is an object of the invention to dynamically triggered, automated, telematics-based automotive systems based on real-time capturing of vehicle telematics data. In particular, it is an object of the present invention to extend the existing technology to a dynamic triggered and dynamically adjustable, multi-tier risk-transfer system based on a dynamic adaptable or even floating first-tier level risk-transfer, thereby reinforcing the importance of developing automated systems allowing self-sufficient, real-time reacting operation. Another object of the invention seeks to provide a way to technically capture, handle and automate dynamically adaptable, complex and difficult to compare risk transfer structures by the user and trigger operations related to automate optimally shared risks and transfer operations. Another object of the invention seeks to dynamically synchronize and adjust such operations to changing environmental or operational conditions by means of telematics data invasive, through the harmonized use of telematics between the different risk-transfer systems based on an appropriate technical trigger structure approach, thus making the different risk-transfer approaches comparable. In contrast to standard practice, the resource pooling systems of the different risk-transfer system will create a comparable risk-transfer structure, making it possible to optimize a risk-transfer operation with the desired, technically based, repetitious accuracy that relies on technical means, process flow and process control/operation. Along the automated insurance telematics value chain, there are many technologies offering individual elements, but it is an object of the present invention to provide a holistic technical solution that covers the whole range from device installation and data capturing to the automated and accurate risk measuring, analysis and management. Finally, it is a further object of the invention to provide a dynamic, expert scoring system based on real-time scoring and measurements, and further to provide a technically scalable solution based on scoring algorithms and data processing making it possible to adapt and compare the signaling to other field of automated risk-transfer.

According to the present invention, these objects are in particular achieved with the features of the independent claims. In addition, further advantageous embodiments can be derived from the dependent claims and the related descriptions.

According to the present invention, the above-mentioned objects for a mobile automotive system for a dynamic, telematics-based connection search engine and telematics data aggregator, are in particular achieved in that, by means of the present invention, wherein the mobile automotive system captures user-specific generated risk-transfer profiles and categorizes the risk-transfer profiles in a result list, and wherein the result list is provided for display and selection to a user of a mobile telecommunication apparatus by means of a mobile telematics application, i.e. a cellular mobile node application, of the mobile telecommunication apparatus, in that the mobile telecommunication apparatus comprises one or more data transmission connection to integrated sensors of the mobile telecommunication apparatus and/or an on-board diagnostic system and/or an in-car interactive device and/or an automotive telematics device of a motor vehicle, wherein the integrated sensors of the mobile telecommunication apparatus and/or the on-board diagnostic system and/or the in-car interactive device and/or the automotive telematics device comprises proprioceptive sensors for sensing operating parameters of the motor vehicle and/or exteroceptive sensors for sensing environmental parameters during operation of the motor vehicle, in that the mobile telematics application comprises a vehicle telematics-driven core aggregator with telematics data-based triggers, which trigger, capture, and monitor said operating parameters and/or environmental parameters during operation of the motor vehicle in the dataflow pathway of the integrated sensors of the mobile phone and/or the on-board diagnostic system and/or the in-car interactive device and/or the automotive telematics device of the motor vehicle, in that the mobile telematics application comprises a score generator measuring and/or generating a single or compound of variable scoring parameters profiling the use and/or style and/or environmental condition of driving during operation of the motor vehicle based on the triggered, captured, and monitored operating parameters or environmental parameters, in that a data link is set by means of the wireless connection of the mobile telecommunication apparatus between the mobile telematics application as client and a central automotive circuit over a mobile telecommunication network, wherein the mobile telecommunication apparatus acts as wireless node within said mobile telecommunication network, and wherein the central automotive circuit automatically collects said single or compound of variable scoring parameters, in that a shadow request is transmitted to a plurality of automated risk-transfer supplier systems, decentrally connected to the central automotive circuit over a data transmission network, wherein the shadow request comprises at least risk-related and/or relevant parameters based on the measured and/or generated single or compound set or record of variable scoring parameters, and wherein, in response to the emitted shadow request, the central automotive circuit receives in response to the emitted shadow request a plurality of individualized risk-transfer profiles based on the dynamically collected single or a compound set of variable scoring parameters, and in that the central automotive circuit dynamically captures and categorizes the received plurality of individualized risk-transfer profiles of the automated risk-transfer supplier systems, wherein the result list is dynamically updated and provided for display and selection to the user of the mobile telecommunication apparatus by means of a mobile telematics application based on the triggered, captured, and monitored operating parameters or environmental parameters during operation of the motor vehicle. The plurality of individualized risk-transfer profiles provided by the automated risk-transfer supplier systems can e.g. time-dependently vary based on the measured time-dependent use and/or style and/or environmental condition of driving by means of the triggered, captured, and monitored operating parameters or environmental parameters during operation of the motor vehicle. The single or compound set of variable scoring parameters profiling the use and/or style and/or environmental condition of driving during operation of the motor vehicle and generated by means of the driving score module can e.g. at least comprise scoring parameters measuring a driving score and/or a contextual score and/or a vehicle safety score. The variable driving score generated by the driving score module can e.g. be at least based upon a measure of driver behavior parameters comprising speed and/or acceleration and/or braking and/or cornering and/or jerking, and/or a measure of distraction parameters comprising mobile phone usage while driving and/or a measure of fatigue parameters and/or drug use parameters. The variable contextual score can e.g. be at least based upon measured trip score parameters based on road type and/or number of intersection and/or tunnels and/or elevation, and/or measured time of travel parameters, and/or measured weather parameters and/or measured location parameters, and/or measured distance driven parameters. The variable vehicle safety score can e.g. be at least based upon measured ADAS feature activation parameters and/or measured vehicle crash test rating parameters and/or measured level of automation parameters of the motor vehicle and/or measured software risk scores parameters. The mobile automotive system for a dynamic, telematics-based connection search engine and telematics data aggregator can e.g. further comprise a linked or electronically associated rating engine for the transmitted risk-transfer profiles of the first risk-transfer systems. The generated scores among the collected telematics data of the driver directly impacts the premium/offer/quotation made by the first risk-transfer systems towards the potential policyholder. The rating engine may e.g. be realized for generating a hierarchic listing in the dynamic result listing based on the rating parameters of the rating engine. The automated risk-transfer supplier systems can comprise associated automated first risk-transfer systems to provide a first risk-transfer based on first risk transfer parameters from the motor vehicle to the respective first risk-transfer system, wherein the first risk-transfer system comprises a plurality of payment transfer modules configured to receive and store first payment parameters associated with risk-transfer of risk exposures of said motor vehicles for pooling of their risks. The risk-relevant parameters of the shadow request can at least comprise usage-based and/or user-based and/or operating automotive data generated by the mobile telematics application of the mobile telecommunication apparatus based upon the triggered, captured, and monitored operating parameters or environmental parameters, and the generated single or set compound of variable scoring parameters. The one or more wireless connections or wired connections of the mobile telecommunications apparatus can e.g. comprise Bluetooth as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on Wi-Fi 802.11 standard, and/or a contactless or contact smart card, and/or a SD card (Secure Digital Memory Card) or another non-volatile memory card.

As an alternative embodiment variant, the mobile telecommunication apparatus, such as a smart phone device, can for example comprise as integrated device components all proprioceptive sensors and/or measuring devices for sensing the operating parameters of the motor vehicle and/or exteroceptive sensors and/or measuring devices for sensing the environmental parameters during operation of the motor vehicle. The mobile telecommunication apparatus can e.g. comprise at least a GPS module (Global Positioning System) and/or geological compass module based on a 3-axis teslameter and a 3-axis accelerometer, and/or gyrosensor or gyrometer, and/or a MEMS accelerometer sensor comprising or consisting of a cantilever beam with the seismic mass as a proof mass measuring the proper or g-force acceleration, and/or a MEMS magnetometer or a magnetoresistive permalloy sensor or another three-axis magnetometer. The defined risk events associated with transferred risk exposure of the motor vehicles can, for example, at least comprise transferred risk exposure related to liability risk-transfers for damages and/or losses and/or delay in delivery, wherein the occurred loss is automatically covered by the first risk-transfer system based on the first risk transfer parameters and correlated first payment transfer parameters (if a requested risk-transfer is not rejected by the system at this time). The exteroceptive sensors or measuring devices can, for example, comprise at least radar devices for monitoring surrounding of the motor vehicle and/or LIDAR devices for monitoring surrounding of the motor vehicle and/or global positioning systems or vehicle tracking devices for measuring positioning parameters of the motor vehicle and/or odometrical devices for complementing and improving the positioning parameters measured by the global positioning systems or vehicle tracking devices and/or computer vision devices or video cameras for monitoring the surrounding of the motor vehicle and/or ultrasonic sensors for measuring the position of objects close to the motor vehicle. To provide the wireless connection, the mobile telecommunications apparatus can, for example, act as wireless node within a corresponding data transmission network by means of antenna connections of the mobile telecommunication apparatus, in particular mobile telecommunication networks such as 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The mobile telecommunication apparatus and the monitoring cellular mobile node application can for example be connected to an on-board diagnostic system and/or an in-car interactive device, wherein the mobile telecommunications apparatus capture usage-based and/or user-based automotive data of the motor vehicle and/or user. The mobile telecommunications apparatus can for example provide the one or more wireless connections by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can for example comprise a Global Positioning System (GPS) circuit and/or the digital radio service module comprises at least a Global System for Mobile Communications (GSM) unit. The plurality of interfaces of the mobile telecommunication apparatus for connection with at least one of a motor vehicle's data transmission bus can for example comprise at least on interface for connection with a motor vehicle's Controller Area Network (CAN) bus, for example in connection with on-board diagnostics (OBD) port, or other connection for example for battery installed devices, or also OEM (Original Equipment Manufacturer) installed systems getting information access to on-board sensors or entertainment systems (as e.g. Apple Carplay etc.) providing the necessary vehicle sensor information. The central automotive circuit can further comprise an aggregation module providing the risk exposure for one or a plurality of the pooled risk exposed motor vehicles based on the captured risk-related automotive data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk exposed motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters are generated dynamically based on the ratio of the aggregated loss parameter and the aggregated payment parameter. The first and second risk-transfer system can for example be fully automatically steered, triggered, signaled, and mutually activated by means of the central automotive circuit, wherein the steering, triggering, signaling and activating is based on the dynamically adaptable first and second risk transfer parameters and the correlated first and second payment transfer parameters, providing a self-sufficient risk protection for the variable number of motor vehicles associated with the mobile telecommunication apparatus by means of the coupled first and second insurance system. In the context of the first- and second risk-transfer tier, the first risk-transfer system (insurance system) can e.g. comprise an automated first resource pooling system and the second risk-transfer system comprises a automated second resource pooling system (reinsurance system), wherein the risk exposed motor vehicles are connected to the first resource pooling system by means of a plurality of payment transfer modules configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer modules configured to receive and store second payment parameters from the first insurance system for adopting of a portion of the risk exposures accumulated by the first risk-transfer system, and wherein if one of defined risk events occurs, the occurred loss is automatically covered by the expert-system based automotive car system.

One of the advantages of the present system is to provide a technical and comprehensive solution that scores individual drivers based on telematics data. Based on the score and other relevant telematics data visible to consumers and insurers (if the consumer agrees), insurers are able to provide a quote. Furthermore, the present invention provides a completely transparent application of complex risk-transfer assessments, where a mobile telematics application, i.e. a cellular mobile node application, being executed on the mobile phone dynamically collects data when people drive. Users can easily download the mobile node application from an appropriate app store on the network. The present invention makes it possible to provide a system that is not linked to risk-transfer systems or associated insurance companies, as e.g. telematics based added value services. The present invention does not have to be restricted to cellular mobile node applications, but could also be an aftermarket telematics device or an OEM embedded device. Aftermarket devices can for example comprise a Windscreen device, Black box, OBD dongle, CLA device (cigarette lighter adaptor), eCall OBU, and/or navigation system as a stand-alone unit or with a link to the inventive cellular phone node application. Smartphone projection standards to allow mobile devices running a certain operating system to be operated in automobiles through the dashboard's head unit. Examples include Apple Carplay, Mirrorlink, Android Auto, and/or Onboard navigation systems. Other aggregator devices can allow for example be an embedded OEM device and/or infotainment system and/or dashboard's head unit and/or car's touchscreen (e.g. in cars like Tesla) etc. The data can e.g. be analyzed by a third party to provide a scoring of the driving style and then transferred to primary insurer partners, who can give a quote based on the obtained score. It may include other relevant data that insurers can use to differentiate and steer their portfolio. Thus, the inventive system allows a provider/aggregator to bring new telematics consumers to insurers, where the consumers can dynamically select an insurance provider based on these quotes. The telematics-vehicle data makes it possible to dynamically capture a vast number of risk-factors, in addition to risk-factors, as considered by prior art systems. Such risk factor can for example comprise time-dependent speed measuring, hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off-roading, G forces, brake pedal position, driver alertness, CAN (Controller Area Network) bus (vehicle's bus) parameters including fuel level, distance from other vehicles, distance from obstacles, driver alertness, activation/usage of automated features, activation/usage of Advanced Driver Assistance Systems, traction control data, usage of headlights and other lights, usage of blinkers, vehicle weight, number of vehicle passengers, traffic sign information, junctions crossed, running of orange and red traffic lights, alcohol level detection devices, drug detection devices, sensors for driver distraction, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system has been able to process such a variety of dynamically monitored, risk-relevant data. The present system is completely flexible with regard to the risk-exposed motor vehicle or the insured. For example, the present system may provide a 1 or 2 months free risk-transfer or a trial period for a motor vehicle and/or consumer. Afterwards, the consumer can select an insurance provider based on these quotes. Based on its flexibility, the applicability of the present invention is not restricted to risk-transfer in the context of motor vehicle, but can also be applied to other fields of risk-transfer. The invention allows providing an automated and telematics-based risk-transfer platform (that allows almost fully automated risk-transfer, incl. policy issuing, claims handling etc.). As mentioned, the second risk-transfer system and/or its associated first risk-transfer system may offer a free trial period (e.g. 1-2 months) to potential customers (potential policyholder), creating advantages for all parties. Thus, the invention allows to enable features as TBYB (Try Before You Buy) features, which is not possible for competing risk-transfers by prior art systems. Furthermore, the inventive system and platform provides end customer the choice to freely select a risk-transfer provider and product (e.g. PHYD (Pay how you Drive) or PAYD (Pay as you Drive)) based on these quotes. In PHYD, the risk-transfer systems may e.g. discount based on the personal driving behaviour (how a person breaks, accelerates, turns). The discounts are based on telematics devices installed in the motor vehicle and the corresponding captured telematics data that measure behaviour and location over time. In PAYD, the risk-transfer systems may for example discount based on mileage (how much a person drives) and not where or how. The advantage of the generated score parameters mirrors the captured sensory data in that the data components of the score can even for example comprise: customer policy details, individual driving data, crash forensics data, credit scores, statistical driving data, historic claims data, market databases, driving license points, statistical claims data, context data for weather or road type or surroundings. This broad monitoring capability further allows for providing a technical solution using optimized coupling of two automated risk-transfer systems with a better and more effective technical implementations, thereby making it possible to share and minimize the required automotive resources and to provide a unified, optimized multi-tier risk-transfer approach by sharing expert and development means for generating minimized conditions for the resource-pooling that is necessarily required (e.g. pooled premiums). The present invention provides a holistic technical solution that covers the whole range risk-transfer structures from collecting sensor and ADAS (advanced driver assistance systems, or active safety) data to accurate risk analysis for automated risk-transfer systems/coverage and value added services (e.g. stolen vehicle recovery, post-accident services, crash reporting, driver coaching, eCall/bCall, reward, driver scoring, real time traffic information, fuel consumption, social networking, last mile features, car sharing solutions), which is not possible with the prior art systems. Further possible added value services, as also realizable by the present invention, are, for example, stolen vehicle recovery, stolen vehicle tracking, post-accident services, crash reporting, driver coaching/training, eCall/bCall, reward, real-time feedback, driver scoring, driver Safety training, real time traffic information, remote diagnostics, fuel consumption, POS service, social networking, scheduling and dispatch, Geo-fencing, repair costs calculation, fleet management and tracking, map specific services (e.g. preferred restaurants nearby), AV/ADAS, and shared mobility services e.g. ride hailing, car sharing. The present invention provides an automated risk-transfer system for all kinds of risk-transfer schemes, as e.g. motor or product liability (re-)insurance systems and/or risk-transfer systems related to or depending on partially or fully automated vehicles. Also, the present invention provides a holistic and unified, automated technical approach for to motor vehicle coverage in all different structures of risk-transfer, such as product liability for car and/or technology manufacturers, driver liability coverage. Furthermore, the present invention also provides a holistic technical solution that covers the whole range from automotive control circuits and/or telematics devices and/or app installations to the automated and accurate risk measurement, analysis and management. Finally, it is able to provide a dynamic, expert system-based or machine learning-based scoring system based on real-time scoring and measurements, and further provides a technically scalable solution based on scoring algorithms and data processing making it possible to adapt the signaling to other fields of automated risk-transfer. The present invention, which is enhanced by contextual data, is able to provide the best and highest optimized technical solution to the real-time adapted multi-tier risk-transfer system. It makes it possible to capture and control the driver's score behavior, and compare that behavior within the technical operation and context. It makes it possible to automatically capture risk's scores according to location or trip, and to automatically analyze and react on data related to the need of value added services, such as accident notifications and/or feedback to the driver and/or automated fleet risk reporting and/or automated and dynamically optimized underwriting etc.). As an alternative embodiment variant, the score driving module can for example automatically capture risk scores according to a measured maintenance (e.g., maintenance failure by owner) and surveillance factor extracted from the automotive data associated with the motor vehicle or the use of active safety features. The telematics-based feedback means of the system may e.g. comprise a dynamic alert feed via a data link to the motor vehicle's automotive control circuit, wherein the central automotive circuit's heads-up device alerts drivers immediately to a number of performance measures including for example high RPM, i.e. high revolutions per minute as a measure of the frequency of the motor rotation of the motor vehicle's engine, unsteady drive, unnecessary engine power, harsh acceleration, road anticipation, and/or ECO drive. The automotive car system provides the opportunities for risk-adaption and improvement dynamically and in real-time, i.e.

as and when they happen, related to the motor vehicle's risk patterns (e.g., location, speed, etc.). Providing instant feedback to drivers through heads-up training aids and obtaining information sent straight to the mobile telematics device, ensures a two pronged approach to correcting risky (and often expensive) driving habits. Thus, the automotive car system not only allows mutually optimization of the operational parameters of the first and second risk transfer system, but also optimize the risk and/or risk behavior on the level of the risk-exposed motor vehicles. No prior art system allows such an integral, real-time optimization. As another value added service, the automotive car system can for example dynamically generated claim notifications or fleet risk reports of selected motor vehicles. Such fleet reports, automatically generated by the automotive car system, provide a new approach to share and compare vehicles' statistics. The proposed invention with for example prefunding automotive enabled risk-transfer ((re)insurance) means will stimulate the carriers (first-tier risk-transfer systems) to provide their automotive data and claims' histories to the second-tier risk-transfer system in order to continually improve its scoring service, which in turn benefits the carrier by helping reduce costs and combined ratio. Finally, the present invention has a great flexibility compared to classical prior art systems. For example, a classic aggregator system typically includes a fee. Instead of a fee, the present system could be realized based on a second risk-transfer system's agreement with the concerned first risk-transfer system, instead.

In one alternative embodiment, the central, expert system-based circuit comprises a table with stored categorization trigger parameters for triggering a predefined level of scores, wherein the first and second risk transfer parameters and the correlated first and/or second payment transfer parameters are dynamically adapted and/or accumulated by means of the central, expert-system based circuit based on the triggered categorization of the driving motor vehicles during usage and based up the usage-based and/or user-based and/or operational automotive data captured from the plurality of driving motor vehicles. This embodiment has, inter alia, the advantage that it makes it possible to provide new and unified approach for automated risk-transfer for risk associated with risk-exposed motor vehicles, considering dynamically measured, usage-based parameters, allowing a new optimization at the level of the risk-exposed vehicle as well as at the level of the operational pooling of risk-exposure of the first and/or second risk-transfer system.

In one alternative embodiment, the driving score module triggers and automatically selects score driving parameters based on defined score driving behavior pattern by comparing captured automotive data with the defined score driving behavior pattern. The score driving module can further for example automatically capture risk scores according to the measured location or trip of the motor vehicle based on the captured automotive data of the mobile telematics devices associated with the motor vehicles. This alternative embodiment has, inter alia, the advantage that it makes it possible to provide a real-time adapted multi-tier risk-transfer system. Furthermore, it makes it possible to capture and/or control the score driving behavior (also in the sense of location, time, road etc. where the driving takes place), and compare its behavior within the technical operation and context. It makes it possible to automatically capture scored risks according to location or trip, and to automatically analyze and react to data related to the need of added services, such as accident notifications.

In one alternative embodiment, the mobile telematics application and/or the central automotive circuit comprises additional triggers triggering accident notification and/or other added services based on the captured automotive data of the mobile telecommunication apparatus for motor vehicle associated with the motor vehicles. This alternative embodiment has, inter alia, the advantage that the system is capable of providing additional benefit to the customer based on additionally generated signaling.

In another alternative embodiment, the switching device comprises capturing means for capturing a transfer of payment from the first insurance system to the second payment-transfer module, wherein the second layer trigger structure of the system is activatable by triggering a payment transfer matching a predefined activation threshold parameter. In another alternative embodiment, in the case of triggering the occurrence of a loss associated with the occurrence of the defined risk events, a predefined defined portion of the occurred loss covered by the second insurance system based on the second risk transfer parameters and correlated second payment transfer parameters is triggered. Thus, the present invention can be carried out with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, if an excess of a defined activation threshold parameter associated with the occurrence of the defined risk events is triggered, the occurred loss is at least partly covered by the second insurance system based on the second risk transfer parameters and correlated second payment transfer parameters. The activation threshold can be associated with each single loss having occurred or with the accumulated loss measured by means of the aggregated loss parameter. Thus, the non-proportional coupling can be realized in an excess of loss or stop loss risk-transfer structure, wherein the excess of loss structure can for example be based on a Per Risk XL (Working XL), Per Occurrence/Per Event XL (Catastrophe or Cat XL), or Aggregate XL structure. As a more particular alternative embodiment, a periodic payment transfer from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of the mobile telecommunication apparatus or the central automotive circuit by means of the risk event triggers, and wherein the independent verification risk event trigger additionally issues a trigger in the event of the occurrence of indicators regarding risk events in an alternative data flow pathway with independent measuring parameters from the primary data flow pathway, for example of alternative telematics devices, in order to verify the occurrence of the risk events at the risk-exposed automotive motor vehicles. In this alternative, the transfer of payments is only assigned to the corresponding risk exposed motor vehicle if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, e.g. also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the additional advantage that the second insurance system can be activated separately, allowing a controlled and discrete risk transfer and risk cover from the first to the second resource pooling system.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the central automotive circuit comprises means for processing risk-related motor vehicle driving data and providing data regarding the likelihood of said risk exposure for one or a plurality of the pooled risk-exposed motor vehicle, in particular, based on the risk-related motor vehicle data, and wherein the receipt and preconditioned storage of payments from the risk exposed motor vehicles for the pooling of their risks can be determined dynamically based on the total risk and/or the likelihood of risk exposure of the pooled risk-exposed motor vehicles. This alternative embodiment has, inter alia, the advantage that the operation of the first and/or second resource pooling system can be adjusted dynamically to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk-exposed motor vehicles is directly related to the total pooled risk. However, it is important to note, that the present invention does not necessarily have to lead to adjusted pricing or premiums. For example, it could also automatically provide coupons to automated motor vehicles driving in low risk regions, or could provide that nothing changes, but that the system uses the automotive data to decide automatically whether the risk-transfer will be continued the next year. The present invention can also be used exclusively for automatically providing and activating adapted and/or specifically selected value added services, such as claim notifications and/or accident notifications and/or feedback to the motor vehicle or driver and/or automated fleet risk reporting and/or automated and dynamically optimized underwriting etc. Thus, the present invention allows an adaption of the risk of the first risk-transfer tier or system as well as risk at the level of the insured motor vehicles (e.g. by risk-based driver feedback in real-time) and/or the second risk-transfer tier or system. There is no prior art system, allowing such an optimization and/or adaption. The feedback can for example be generated by comparing the motor vehicle's profile and pattern with other motor vehicles' profiles or pattern at the same location and/or under comparable conditions.

In one alternative embodiment, the system comprises means for processing risk-related component data and providing information regarding the likelihood of said risk exposure for one or a plurality of the pooled risk exposed motor vehicles, in particular, based on risk-related motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk-transfer system to a range where non-covariant, occurring risks covered by the risk-transfer system affect only a relatively small proportion of the total pooled risk exposure components at any given time. Analogously, the second risk-transfer system can for example dynamically adjust the number of pooled risk shares transferred from first risk-transfer systems to a range where non-covariant, occurring risks covered by the second risk-transfer system affect only a relatively small proportion of the total pooled risk transfers from first risk-transfer systems at any given time. This alternative variant has, inter cilia, the advantage that the operational and financial stability of the system can be improved.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and the total allocated payment is transferable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example depend on the stage of the occurrence of a risk event, as triggered by the system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
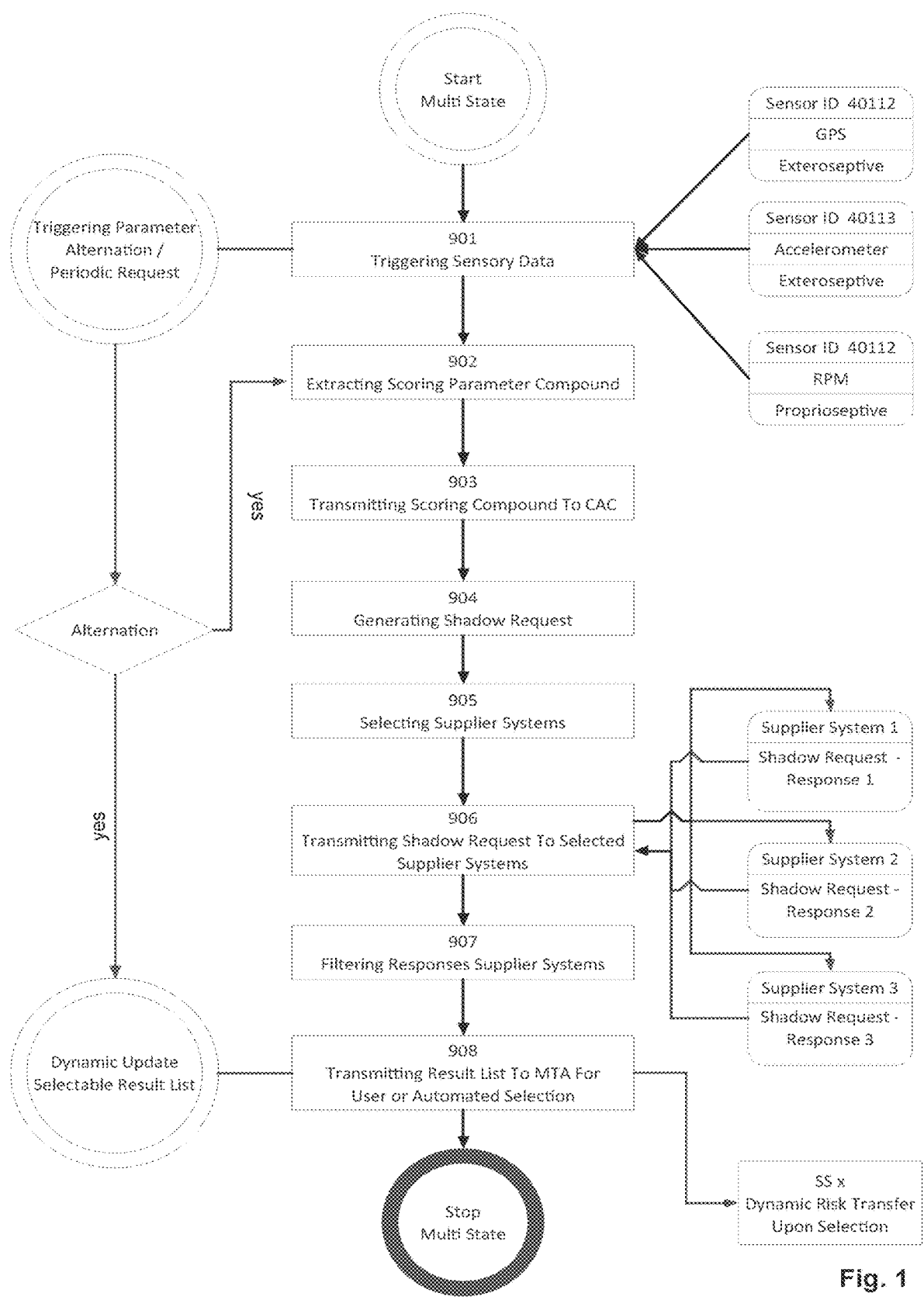
FIG. 1 shows a block diagram schematically illustrating operational flow and processing steps according to an embodiment of the present invention for example according to FIG. 2. The illustrated operation flow and processing steps be central automotive circuit 11 or mobile telematics application 101 realized on the mobile telecommunication apparatus 10. The later may have the advantage to be faster to realize.
Figure 2:
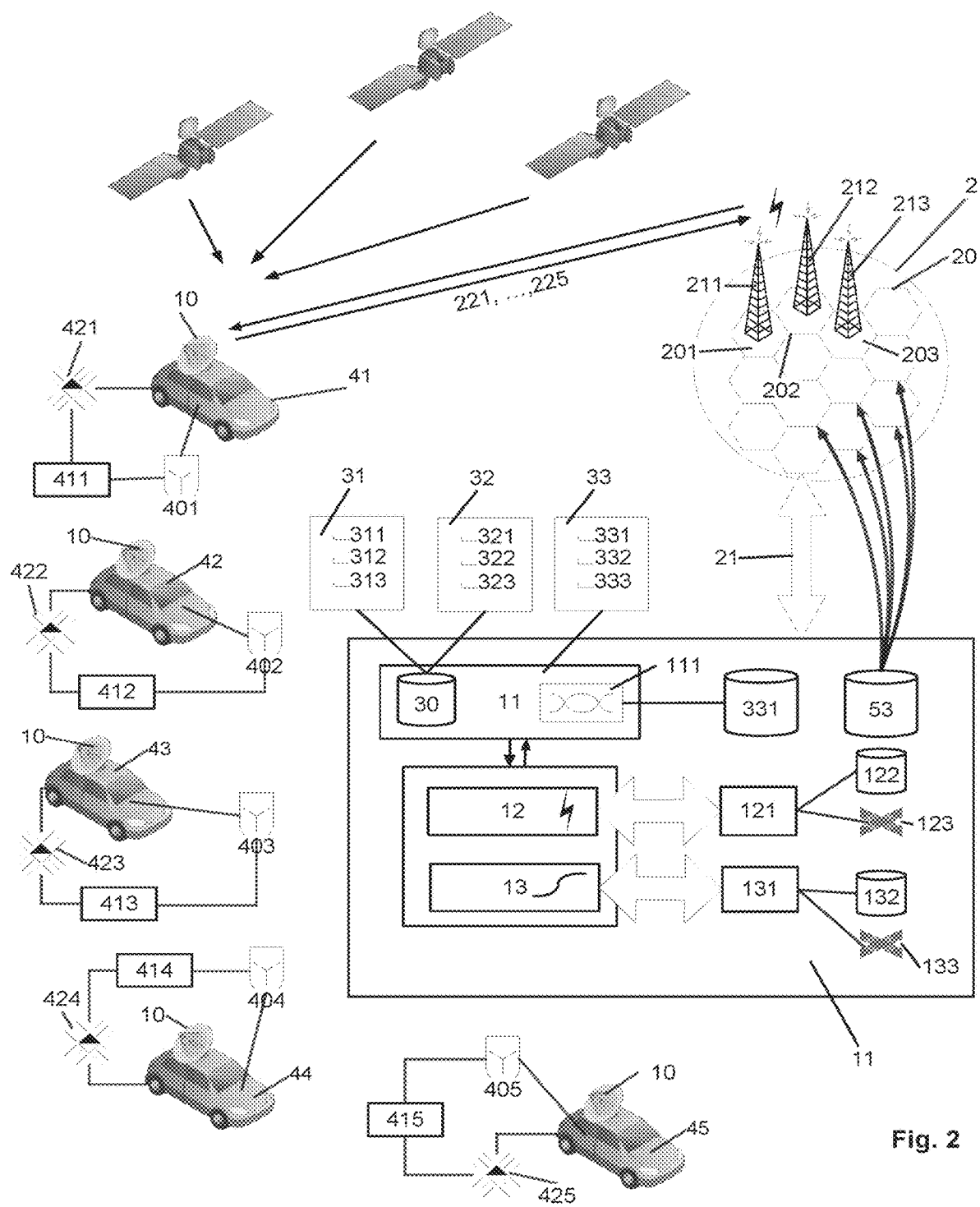
FIG. 2 shows a block diagram schematically illustrating an exemplary mobile automotive system 1 with mobile telecommunications apparatuses 10 associated with a plurality of motor vehicles 41, . . . , 45 capturing measuring parameters in real-time and dynamically adapting its operational parameters. In particular, it shows a mobile automotive system 1 with mobile telecommunication apparatus 10 comprising one or more wireless connections 105 and a plurality of interfaces for connection with at least one of a vehicle's data transmission bus and/or with sensors and/or measuring devices 102 and/or speakers 1021 and/or microphones 1022. The mobile telecommunication apparatus are connected to an on-board diagnostic system 431, . . . , 435 and/or an in-car interactive device 441, . . . , 445 and/or automotive telematics devices 451, . . . , 455, wherein the mobile telecommunications apparatuses 10 capture usage-based 31 and/or user-based 32 telematics data 3 of the motor vehicle 41, . . . , 45 and/or user 321, 322, 323, and transmit them via the data transmission network 2 to the central automotive circuit 11.
Figure 3:
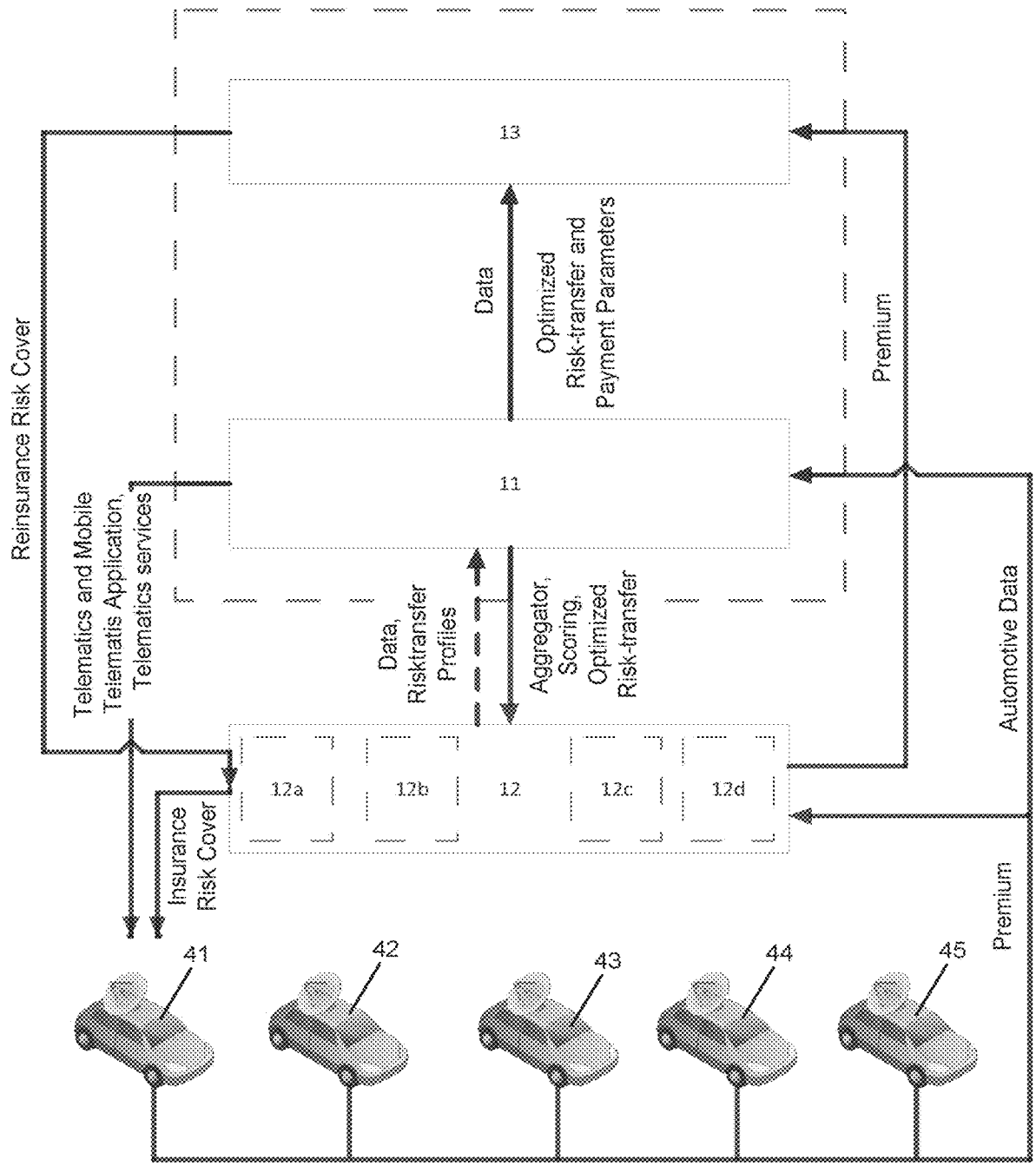
FIG. 3 shows a block diagram schematically illustrating an exemplary dynamically adaptable automotive system 1 with the mobile telecommunications apparatuses 10 assigned to a plurality of risk-exposed motor vehicles 41, . . . , 45, according to an alternative embodiment of the invention. The mobile telecommunications apparatuses 10 capture by means of the mobile telematics application 101 usage-based 31 and/or user-based 32 telematics data 3 of the motor vehicle 41, . . . , 45 and/or user 321, 322, 323, and transmit them via the data transmission network 2 to the central automotive circuit 11. The system 1 is capable of capturing different kinds of telematics data 3, such as driving behavior from the user and/or whether the motor vehicle 41, . . . , 45 is driving itself (auto piloting) and/or the motor vehicle 41, . . . , 45 is intervening with its automated or safety features. The latter is possible, if the mobile telecommunications apparatuses 10 capture data 3 from the motor vehicle 41, . . . , 45 itself. The mobile telecommunication apparatus 10 or the mobile telematics applications 101 can generate data 3 themselves by means of their own sensors, and/or of sensors of the motor vehicle's systems, e.g. provided by an on-board diagnostic system. As seen from FIG. 3, the central automotive circuit 11 is realized as a separate part of the mobile automotive car system 1, or as a part of the second risk-transfer system 13, wherein in the latter case, the mobile telematics application 101 can be provided by the second risk-transfer system 13 to the first risk-transfer system 12 and/or the risk-exposed motor vehicles 41, . . . , 45, in exchange for having access to the captured telematics data 3 and/or captured claim or loss data 711, . . . , 715/721, . . . , 725/731, . . . , 735. As also illustrated by FIG. 3, the mobile automotive car system 1 may comprise one first risk-transfer system 10 or a plurality of first risk-transfer systems 10*a*-10*d*, all associated with the same second risk-transfer system 12.
Figure 4:
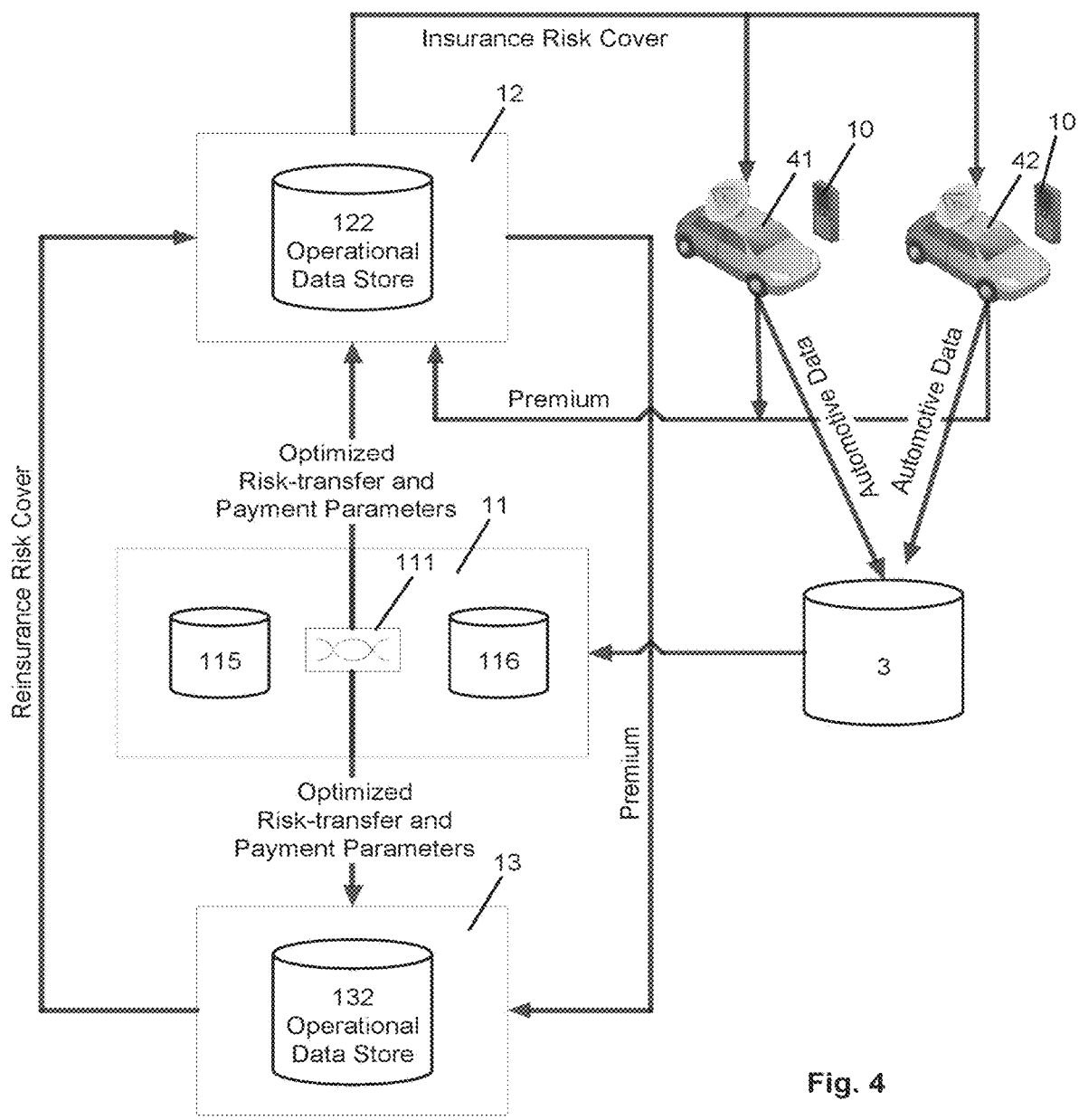
FIG. 4 shows another block diagram schematically illustrating an exemplary dynamically adaptable automotive car system 1 with mobile telecommunications apparatuses 10 associated with a plurality of risk-exposed motor vehicles 41, . . . , 45, according an alternative embodiment of the invention. In particular, it shows a central automotive circuit 11. The mobile telecommunications apparatuses 10 capture usage-based 31 and/or user-based 32 telematics data 3 of the motor vehicle 41, . . . , 45 and/or user 321, 322, 323, and transmit them via the data transmission network 2 to the central automotive circuit 11, which cooperates with the coupled first and second risk-transfer systems 12/13.
Figure 5:
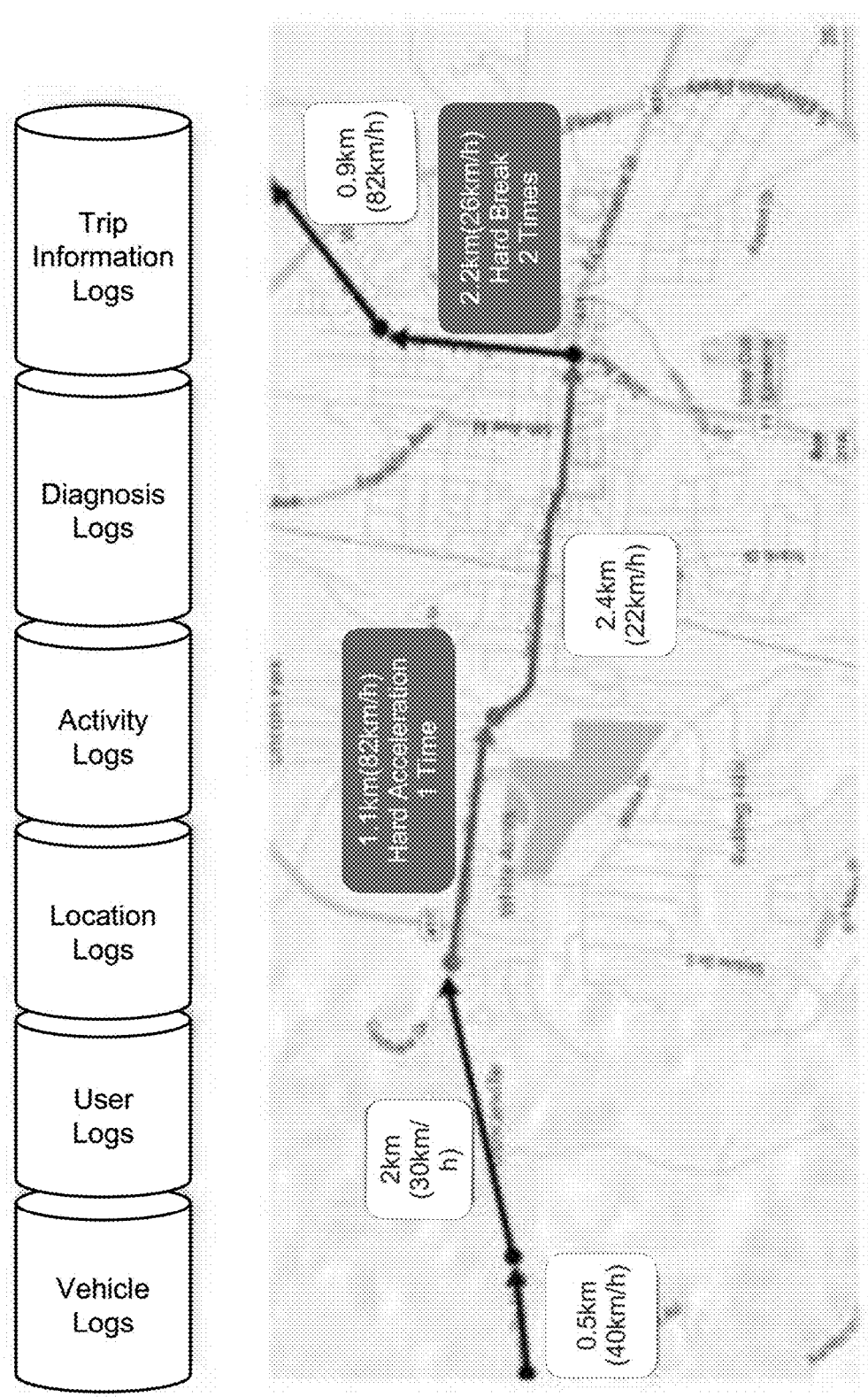
FIG. 5 shows a block diagram schematically illustrating an exemplary mobile telematics application 101 and real-time telematics data capturing.

FIG. 1 schematically illustrates an architecture for a possible implementation of an embodiment of the automotive, dynamically triggered car system and multi-tier risk-transfer/prediction system 1, in particularly providing a dynamic, telematics-based connection search engine and telematics data aggregator by means of a mobile telecommunication apparatus 10 executing a mobile telematics application 101 and a central automotive circuit 11. The mobile automotive car system 1 reacts in real-time, dynamically on captured environmental or operational parameters 3, in particular on monitored and captured automotive parameters 3 of motor vehicles 41, . . . , 45 during operation. The present invention further is able to provide a telematics based automated risk-transfer, alert and real-time notification systems for motor vehicles 41, . . . , 45 and wireless technology used in the context of telematics. Finally, the present system 1 also provides to telematics-based real-time expert systems. Thus, the inventive system 1 provides a structure for the use of telematics together with real-time risk-monitoring, automated risk-transfer and insurance systems based on captured and measured usage-based and/or user-based telematics data 3.

To provide the dynamic, telematics-based connection search engine and telematics data aggregator, the mobile automotive system 1 captures and categorizes risk-transfer profiles 124 in a results list 118, wherein the results list 118 is provided for display to and selection by a user of a mobile telecommunication apparatus 10 by means of a mobile telematics application 101 of the mobile telecommunications apparatuses 10. For the purpose of the present application, the term "search engine" refers to a system for active or passive searching or providing information (e.g., accessible risk-transfer profiles) and/or facilitating one or more transactions, e.g. risk-transfers, associated with the information. This is, the result list 118 with risk-transfer profiles 124 generated by the first risk-transfer systems 12 and appropriate first payment transfer parameters 1221, . . . , 1225 and e.g. its pricing, based on the driving behavior and the scores driving parameters 1111, . . . , 1117, for example, collected in a predefined trial period. Furthermore, for the purpose of the present application, the term "real time" refers to an essentially instantaneous or interactive process (as opposed to a process which occurs relatively slowly, as in a "batch" or non-interactive manner)

The mobile telecommunication apparatus 10 comprises one or more data transmission connection to integrated sensors 102, . . . , 109 of the mobile telecommunication apparatus 10 and/or an on-board diagnostic system 431, . . . , 435 and/or an in-car interactive device 441, . . . , 445 and/or automotive telematics devices 451, . . . , 455 of a motor vehicle 41, . . . , 45. The integrated sensors 102, . . . , 109 of the mobile telecommunication apparatus 10 and/or the on-board diagnostic system 431, . . . , 435 and/or the in-car interactive device 441, . . . , 445 and/or the automotive telematics devices 451, . . . , 455 comprise proprioceptive sensors 4021 for sensing operating parameters 40121 of the motor vehicle 41, . . . , 45 and/or exteroceptive sensors 4011 for sensing environmental parameters 40111 during operation of the motor vehicle 41, . . . , 45. The exteroceptive sensors or measuring devices 4011 can, for example, comprise at least radar devices 40117 for monitoring the surrounding of the motor vehicle 41, . . . , 45 and/or LIDAR devices 40115 for monitoring the surrounding of the motor vehicle 41, . . . , 45 and/or global positioning systems 40122 or vehicle tracking devices for measuring positioning parameters of the motor vehicle 41, . . . , 45 and/or odometrical devices 40114 for complementing and improving the positioning parameters measured by the global positioning systems 40112 or vehicle tracking devices and/or computer vision devices 40116 or video cameras for monitoring the surrounding of the motor vehicle 41, . . . , 45 and/or ultrasonic sensors 40113 for measuring the position of objects close to the motor vehicle 41, . . . , 45. The proprioceptive sensors or measuring devices 4012 for sensing operating parameters 40121 of the motor vehicles 41, . . . , 45 can at least comprise a motor speed and/or wheel load and/or heading and/or battery status of the motor vehicles 41, . . . , 45. The one or more wireless connections 105 or wired connections of the mobile telecommunication apparatus 10 can for example comprise Bluetooth as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on the Wi-Fi 802.11 standard, and/or a contactless or contact smart card, and/or a SD card (Secure Digital Memory Card) or another interchangeable non-volatile memory card.

For providing the wireless connection 105, the mobile telecommunication apparatus 10 can for example act as a wireless node within a corresponding data transmission network by means of antenna connections of the mobile telecommunications apparatuses 10, in particular, as mentioned, mobile telecommunication networks such as 3G, 4G, 5G LTE (Long-Term Evolution) networks or mobile WiMAX or other GSM/EDGE- and UMTS/HSPA-based network technologies etc., and more particularly with appropriate identification means as SIM (Subscriber Identity Module) etc. The mobile telecommunications apparatuses 10 and the monitoring cellular mobile node application 101 can e.g. be connected to an on-board diagnostic system 431, . . . , 435 and/or an in-car interactive device 441, . . . , 445, wherein the mobile telecommunications apparatuses 10 capture usage-based 31 and/or user-based 32 automotive data 3 of the motor vehicle 41, . . . , 45 and/or user. The mobile telecommunications apparatuses 10 can for example provide the one or more wireless connections 1024 by means of radio data systems (RDS) modules 10241 and/or positioning system 10242 including a satellite receiving module and/or a mobile cellular phone module 10243 including a digital radio service module and/or a language unit 10244 in communication with the radio data system 10241 or the positioning system 10242 or the cellular telephone module 10243. The satellite receiving module 10242 can for example comprise a Global Positioning System (GPS) circuit and/or the digital radio service module comprises at least a Global System for Mobile Communications (GSM) unit. The plurality of interfaces of the mobile telecommunications apparatuses 10 for connection with at least one of a motor vehicle's data transmission bus can for example comprise at least on interface for connection with a motor vehicle's Controller Area Network (CAN) bus, e.g. in connection with an on-board diagnostics (OBD) port, or another connection for example for battery installed devices, or also OEM (Original Equipment Manufacturer) installed systems obtaining information access to on-board sensors or entertainment systems (such as Apple Carplay etc.) providing the necessary vehicle sensor information. The measured operating parameters 40121 and/or environmental parameters 40111 during operation of the motor vehicle 41, . . . , 45 can for example comprise time-dependent speed measuring, hard braking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off-roading, G forces, brake pedal position, driver alertness, CAN (Controller Area Network) bus (vehicle's bus) parameters including fuel level, distance to other vehicles, distance from obstacles, driver alertness, activation/usage of automated features, activation/usage of Advanced Driver Assistance Systems, traction control data, usage of headlights and other lights, usage of blinkers, vehicle weight, number of vehicle passengers, traffic sign information, junctions crossed, running of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system has been able to process such a variety of dynamically monitored, risk-related data. The advantage of the generated score parameters mirrors the captured sensory data in that the data components of the score can even for example comprise: customer policy details, individual driving data, crash forensics data, credit scores, statistical driving data, historic claims data, market databases, driving license points, statistical claims data, context data of weather or road type or surrounding.

The mobile telematics application 10 comprises a vehicle telematics-driven core aggregator 1011 with telematics data-based triggers 1012 triggering, capturing, and monitoring said operating parameters 40121 and/or environmental parameters 40111 during operation of the motor vehicle 41, . . . , 45 in the dataflow pathway 103 of the integrated sensors and/or the on-board diagnostic system 431, . . . , 435 and/or the in-car interactive device 441, . . . , 445 and/or the automotive telematics device 451, . . . , 455 and/or the OEM devices 411, . . . , 415 of the motor vehicle 41, . . . , 45. In an alternative embodiment, the mobile telecommunication apparatus 10, such as smart phone devices, can for example comprise as integrated device components all proprioceptive sensors and/or measuring devices 4021 for sensing the operating parameters 40121 of the motor vehicle 41, ..., 45 and/or exteroceptive sensors and/or measuring devices 4011 for sensing the environmental parameters 40111 during operation of the motor vehicle 41, ..., 45. The mobile telecommunication apparatus can for example comprise at least a GPS module (Global Positioning System) and/or geological compass module based on a 3-axis teslameter and a 3-axis accelerometer, and/or gyrosensor or gyrometer, and/or a MEMS accelerometer sensor comprising a cantilever beam with the seismic mass as a proof mass measuring the proper or g-force acceleration, and/or a MEMS magnetometer or a magnetoresistive permalloy sensor or another three-axis magnetometers.

The mobile telematics application 101 comprises a driving score module 1013 measuring and/or generating a single or a compound set of variable scoring parameters 10131 profiling the use and/or style and/or environmental condition of driving during operation of the motor vehicle 41, ..., 45 based on the triggered, captured, and monitored operating parameters 40111 or environmental parameters 40121. Thus, the system 1 scores individual drivers based on the monitored operating parameters 40111 or environmental parameters 40121. Based on the score and/or other relevant telematics data visible to consumers and the risk-transfer provider (insurers) (if the consumer agrees), the supply systems 12 are able to quote. The single or compound set of variable scoring parameters 10131/1111, ..., 1117 profile the use and/or style and/or environmental condition of driving during operation of the motor vehicle 41, ..., 45. The single or compound set of variable scoring parameters 10131/1111, ..., 1117 generated by means of the driving score module 111 can at least comprise variable scoring parameters 10131/1111, ..., 1117 measuring a driving score 1111 and/or a contextual score 1112 and/or a vehicle safety score 1113 and/or a cyber risk score 1114 and/or a software certification/testing risk score 1115 and/or a NHTSA (National Highway Traffic Safety Administration) level risk score 1116 and/or a usage/operation of autonomous driving aids 1117. The variable driving score parameter 1111 can e.g. be at least based upon a measure of driver behavior parameters comprising speed and/or acceleration and/or braking and/or cornering and/or jerking, and/or a measure of distraction parameters comprising mobile phone usage while driving and/or a measure of fatigue parameters and/or drug use parameters. The variable contextual score parameter 1112 can e.g. be at least based upon measured trip score parameters based on road type and/or number of intersection and/or tunnels and/or elevation, and/or measured time of travel parameters, and/or measured weather parameters and/or measured location parameters, and/or measured distance driven parameters. The variable vehicle safety score parameter 1113 can e.g. be at least based upon measured ADAS feature activation parameters and/or measured vehicle crash test rating parameters and/or measured level of automation parameters of the motor vehicle 41, ..., 45 and/or measured software risk scores parameters. A data link 21 is set by means of the wireless connection 105 of the mobile telecommunications apparatus 10 over a mobile telecommunication network 2 between the mobile telematics application 101 as client and a central automotive circuit 11. The mobile telecommunication apparatus 10 acts as wireless node 221, ..., 225 within said mobile telecommunication network 2. The central automotive circuit 11 automatically collects said single or compound set of variable scoring parameters 10131 of the driving score module 1013 or generates said single or set compound of variable scoring parameters 1111, ..., 1117, by means of the driving score module 111, based on the triggered and aggregated automotive data 3. In the latter case, the automotive data 3 are triggered and aggregated by means of the central automotive circuit 11 and the vehicle-operation driven core aggregator 110.

A shadow request 119 is transmitted to a plurality of automated risk-transfer supplier systems 12, decentrally connected to the central automotive circuit 11 over a data transmission network. The shadow request 119 comprises at least risk-relevant or risk-related parameters based upon the measured and/or generated single or compound set of variable scoring parameters 10131. In response to the emitted shadow request 119, the central automotive circuit 11 receives a plurality of individualized risk-transfer profiles 124 based upon the dynamically collected single or compound set of variable scoring parameters 10131. The risk-related parameters of the shadow request 119 comprise at least usage-based 31 and/or user-based 32 and/or operating 33 automotive data 3 generated by the mobile telematics application 101 of the mobile telecommunications apparatus 10 based upon the triggered, captured, and monitored operating parameters 40111 or environmental parameters 40121, and the generated single or compound set of variable scoring parameters. The shadow requests 119 can for example be periodically transmitted to the plurality of automated risk-transfer supplier systems 12 based on the dynamically generated single or compound set of variable scoring parameters 10131 and/or the triggered, captured, and monitored operating parameters 40111 or environmental parameters 40121, and wherein the result list (118) is dynamically adapted in real-time and displayed to the user for selection. However, the shadow requests 119 can also be generated and transmitted to the plurality of automated risk-transfer supplier systems 12 based on the dynamically generated single or compound set of variable scoring parameters 10131 and/or the triggered, captured, and monitored operating parameters 40111 or environmental parameters 40121, if the mobile telematics application 101 triggers an alternation of the dynamically generated single or compound set of variable scoring parameters 10131 and/or the triggered, captured, and monitored operating parameters 40111 or environmental parameters 40121, and wherein the result list 118 is dynamically adapted in real-time and displayed to the user for selection. As an alternative embodiment, a combination of the two before mentioned shadow request generations may also be applied.

The central automotive circuit 11 dynamically captures and categorizes the received plurality of individualized risk-transfer profiles 124 of the automated risk-transfer supplier systems 12. The results list 118 is dynamically updated and provided for display and selection to the user of the mobile telecommunication apparatus 10 by means of the mobile telematics application 101 based on the triggered, captured, and monitored operating parameters 40121 or environmental parameters 40111 during operation of the motor vehicle 41, ..., 45. Therefore, the plurality of individualized risk-transfer profiles 124, provided by the automated risk-transfer supplier systems 12, time-dependently vary based on the generated single or compound set of variable scoring parameters 10131 measuring the time-dependent use and/or style and/or environmental condition of driving during operation of the motor vehicle 41, ..., 45. The mobile automotive system 1 can for example automatically alert the user, if a more preferable risk-transfer profile 124 is triggered in relation to a previously selected risk-transfer profile 124. Furthermore, the mobile automotive system 1 can also automatically adapt a risk-transfer associated with a user or mobile telecommunications apparatus 10, if a more preferable risk-transfer profile 124 is triggered in relation to a selected risk-transfer profile 124. The result list 118 can be adapted dynamically in real-time and displayed to the user for selection based upon definable categorization criteria as for example first payment parameters 1221, . . . , 1225 and/or duration and/or risk-transfer structure.

LIST OF REFERENCE SIGNS

1 Mobile automotive car system
  10 Mobile telecommunications apparatus
    101 Mobile telematics application (cellular mobile node application)
      1011 Vehicle-operation driven core aggregator
      1012 Telematics data-driven triggers
      1013 Driving Score Module
        10131 Compound set of variable scoring parameters
      1014 Additional trigger triggering accident notification
      1015 Additional trigger triggering added services
    102 Integrated Sensors of the mobile node
      1020 MEMS magnetometer
      1021 Speakers
      1022 Microphones
      1023 Device alerts drivers
      1024 Wireless connections
        10241 Radio data systems (RDS) modules
        10242 Positioning system modules
        10243 Mobile cellular telephone interface
        10244 Language unit
        10245 Satellite receiving module
      1025 Accelerometer
      1026 Gyroscope
      1027 Cameras
      1028 Touchscreen
      1029 MEMS compass module
    103 Dataflow pathway
    105 Wireless connections
      1051 GPS
      1052 WLAN
      1053 Bluetooth
  11 Central automotive circuit
    110 Vehicle-operation driven core aggregator
    111 Driving score module
      1111, . . . , 1117 Scores driving parameters
        1111 Driving score
        1112 Contextual score
        1113 Vehicle safety score
        1114 Cyber risk score
        1115 Software certification/testing risk score
        1116 NHTSA level risk score
        1117 Usage/operation of autonomous driving aids
      1121, . . . , 1123 Defined scores driving behavior pattern
    112 Additional trigger triggering accident notification
    113 Additional trigger triggering added services
    114 Aggregation module
      1141 Predefined time period
    115 Database with historical data
    116 Automated database with location-dependent data
    117 Switching device
    118 Dynamic result listing
    119 Shadow request
  12 Automated risk-transfer supplier systems
    121 Automated resource pooling system
    122 First data store
      1221, . . . , 1225 First payment parameters
    123 First payment transfer modules
    124 Generated risk transfer profiles
  13 Second risk-transfer system
    131 Automated resource pooling system
    132 Second data store
      1321, . . . , 1325 Second payment parameters
    133 Second payment transfer modules
      1331 Control device
      1332 Activation control parameter
    134 Activation threshold parameter
    135 Predefined loss covering portion
2 Data transmission network
  20 Cellular network grid
    201, . . . , 203 Network cell/Basic service area
    211, . . . , 213 Base (transceiver) station
      2111, . . . , 2131 Cell Global Identity (CGI)
    221, . . . , 225 Mobile network nodes
  21 Uni- or bidirectional data link
3 Automotive data
  31 Usage-based automotive data
    311, . . . , 313 Usage-based automotive data of the vehicles 41, . . . , 45
  32 User-based automotive data
    321, . . . , 323 User-based automotive data of the vehicles 41, . . . , 45
  33 Operational automotive data
    331, . . . , 333 Operational data of the control system 461, . . . , 465
41, . . . , 45 Motor vehicles
  401, . . . , 405 On-board sensors and measuring devices
    4011 Exteroceptive sensors or measuring devices
      40111 Sensory data of the exteroceptive sensors
      40112 Global Positioning System (GPS)
      40113 Ultrasonic sensors
      40114 Odometry sensors
      40115 LIDAR (light detection and ranging)
      40116 Video cameras
      40117 Radar Sensors
    4012 Proprioceptive sensors or measuring devices
      40121 Sensory data of the proprioceptive sensors
  411, . . . , 415 OEM (Original Equipment Manufacturer) devices
  421, . . . , 425 Data transmission bus interface
  431, . . . , 435 On-board diagnostic system
  441, . . . , 445 In-car interactive device
  451, . . . , 455 Automotive telematics devices
5 Aggregated risk exposure
  51, . . . , 55 Transferred risk exposures of the motor vehicles
    501, . . . , 505 First risk transfer parameters
    511, . . . , 515 Second risk transfer parameters
6 Predefined risk events
  61 Predefined risk events related to liability coverage for damages
    611, . . . , 613 Parameters measuring the occurrence of events 61

62 Predefined risk events related to liability coverage for losses
   621, . . . , 623 Parameters measuring the occurrence of events 62
63 Predefined risk events related to liability coverage for delay in delivery
   631, . . . , 633 Parameters measuring the occurrence of events 63
71, . . . , 75 Occurred loss associated with the motor vehicles 41, . . . , 45
   711, . . . , 715 Captured loss parameters of measured predefined event 1
   721, . . . , 725 Captured loss parameters of measured predefined event 2
   731, . . . , 735 Captured loss parameters of measured predefined event 3
80 Aggregated loss parameter
81 Aggregated payment parameter
82 Variable loss ratio parameter
   821 Loss ratio threshold value
901 Triggering Sensory Data
902 Extracting Scoring Parameter Compound
903 Transmitting Scoring Compound To CAC (Central automotive circuit)
904 Generating Shadow Request
905 Selecting Supplier Systems
906 Transmitting shadow Request to Selected Supplier Systems/First Risk-Transfer Systems
907 Filtering Responses from Supplier Systems/First Risk-Transfer Systems
908 Transmitting Results List To MTA (Mobile telematics application) for User or Automated Selection

The invention claimed is:

1. A mobile automotive system for real-time risk-monitoring and automated risk-transfer based on captured and measured usage-based and user-based telematics data providing an optimized automated risk-transfer operation based on an automated telematics risk-transfer chain, the system comprising:

a mobile telecommunication apparatus that includes one or more data transmission connections to a plurality of sensors including proprioceptive sensors for sensing operating parameters of a motor vehicle and exteroceptive sensors for sensing environmental parameters during operation of the motor vehicle;

a central automotive circuit that includes a vehicle telematics-driven core aggregator with telematics data-based triggers for triggering, capturing, and monitoring in a dataflow pathway of the plurality of sensors the operating parameters and the environmental parameters during operation of the motor vehicle;

a first risk-transfer system including a plurality of payment transfer modules configured to receive and store first payment parameters associated with a risk-transfer of risk exposures of motor vehicles for pooling of their risks, wherein an automated first risk-transfer system provides a first risk-transfer based on first risk transfer parameters from the motor vehicle to the first risk-transfer system;

a second risk-transfer system to provide a second risk-transfer based on second risk-transfer parameters from an automated risk-transfer supplier system or from the automated first risk-transfer system to the second risk-transfer system, wherein the second risk-transfer system includes second payment transfer modules configured to receive and store second payment parameters for pooling of risks of the first risk-transfer systems associated with risk exposures transferred to the first risk-transfer systems, wherein the first and second risk transfer parameters and the correlated first and second payment parameters are dynamically adapted by the mobile automotive system based on usage-based automotive data, user-based automotive data, and operational automotive data captured from the motor vehicle, based on the risk-transfer profile selection of the user and based on the pooled risks of the first risk transfer systems, wherein the central automotive circuit further includes a driving scorer for generating a set of variable scoring parameters profiling at least one of a use, a style, and an environmental condition of driving during operation of the motor vehicle based on the measured and monitored operating parameters and the environmental parameters, wherein the driving scorer generates the set of variable scoring parameters, triggers and automatically selects score driving parameters based on a defined score driving behavior pattern by comparing the measured operating parameters and the environmental parameters with operating parameters and the environmental parameters of the defined score driving behavior pattern, wherein the mobile communication apparatus establishes a data link over a mobile telecommunication network between the mobile communication apparatus and the central automotive circuit, wherein the mobile telecommunication apparatus acts as a wireless node within the mobile telecommunication network, wherein the central automotive circuit automatically collects the set of variable scoring parameters, and wherein the central automotive circuit is electronically coupled to a heads-up device and is configured to provide an alert via the heads-up device to an operator of the motor vehicle upon detection of set of performance measures including high revolutions per minute (RPM) as a measure of the frequency of a motor rotation of an engine of the motor vehicle, engine power, acceleration, and road anticipation, wherein the set of variable scoring parameters includes a driving score, a contextual score, a vehicle safety score, a cyber risk score, a software certification/testing risk score, a National Highway Traffic Safety Administration (NHTSA) level risk score, and a usage/operation of autonomous driving aids, wherein the central automotive circuit periodically transmits a shadow request to a plurality of automated risk-transfer supplier systems, decentrally connected to the central automotive circuit over a data transmission network, wherein the shadow request includes risk-related parameters based on the set of variable scoring parameters, wherein a plurality of individualized risk-transfer profiles are provided by the automated risk-transfer supplier systems varying time-dependently based on the generated set of variable scoring parameters measuring the time-dependent use, style, and environmental condition of driving during operation of the motor vehicle, and wherein in response to the emitted shadow request, the central automotive circuit receives the plurality of individualized risk-transfer profiles based on the set of variable scoring parameters, and wherein the central automotive circuit dynamically captures and categorizes the received plurality of individualized risk-transfer profiles of the automated risk-transfer supplier systems in a result list, wherein the shadow requests are periodically transmitted to the plurality of automated risk-transfer supplier systems at least based on a dynamically-generated set of variable scoring parameters, wherein the results list is dynamically updated in real-time and provided for display and selection to a user of the mobile telecommunication apparatus based on the operating parameters and the environmental parameters, and wherein the mobile automotive system automatically adapts a risk-transfer of a user or alerts the user if a more preferable risk-transfer profile is triggered in relation to a selected risk-transfer profile, and wherein the risk-transfer profiles are captured and categorized in the result list by the mobile automotive system, wherein the shadow requests are generated and transmitted to the plurality of automated risk-transfer supplier systems based on the set of variable scoring parameters, the operating parameters, and the environmental parameters, when a mobile telematics application triggers an alternation of any one of the set of variable scoring parameters, the operating parameters, and the environmental parameters, and wherein the result list is dynamically adapted in real-time and displayed to the user for selection.

2. The mobile automotive system according to claim 1, wherein the driving score is based at least on a measure of driver behavior parameters including at least one of speed, acceleration, braking, cornering, jerking, a measure of distraction parameters including mobile phone usage while driving, a measure of fatigue parameters, and drug use parameters.

3. The mobile automotive system according to claim 1, wherein the contextual score is based at least on measured trip score parameters that are based at least on one of a road type, a number of intersections, a number of tunnels, elevation, measured time of travel parameters, measured weather parameters, measured location parameters, and measured distance driven parameters.

4. The mobile automotive system according to claim 1, wherein the vehicle safety score is based at least on one of measured Advanced Driver Assistance System (ADAS) feature activation parameters, measured vehicle crash test rating parameters, measured level of automation parameters of the motor vehicle, and measured software risk scores parameters.

5. The mobile automotive system according to claim 1, wherein the automated first risk-transfer supplier systems include the automated first risk-transfer system that provides the first risk-transfer based on the first risk transfer parameters from the motor vehicle to the first risk-transfer system.

6. The mobile automotive system according to claim 5, wherein the transmitted shadow request with risk-related automotive data is processed by the automated risk-transfer supplier systems, wherein first risk transfer parameters and correlated first payment transfer parameters are generated by the automated risk-transfer supplier systems, and wherein, if the occurrence of one of a defined risk events associated with transferred risk exposure of the motor vehicles is triggered, an occurred loss is automatically covered by the corresponding automated risk-transfer supplier system or the automated first risk-transfer system based on the first risk transfer parameters and correlated first payment transfer parameters.

7. The mobile automotive system according to claim 1, wherein the risk-related parameters of the shadow request include at least one of usage-based automotive data, user-based automotive data, and operating automotive data generated by a mobile telematics application of the mobile telecommunications apparatus based on the operating parameters or the environmental parameters, and the set of variable scoring parameters.

8. The mobile automotive system according to claim 1, wherein the mobile telecommunications apparatus is configured to communicate via at least one of Bluetooth as wireless connection for exchanging data using short-wavelength Ultra High Frequency (UHF) radio waves in the Industrial, Scientific, and Medical (ISM) radio band from 2.4 GHz to 2.485 GHz by building personal area networks (PAN) with on-board Bluetooth capabilities, 3G, 4G, GPS, Bluetooth Low Energy (LE), Wi-Fi 802.11, a contactless or contact smart card, a Secure Digital (SD) memory card, and an interchangeable non-volatile memory card.

9. The mobile automotive system according to claim 1, wherein the mobile telecommunication apparatus includes at least one of the proprioceptive sensors and the exteroceptive sensors.

10. The mobile automotive system according to claim 9, wherein the mobile telecommunication apparatus includes at least one of a GPS module, a geological compass module based on a 3-axis teslameter and a 3-axis accelerometer, a gyrosensor, a pyrometer, Micro-Electro-Mechanical Systems (MEMS) accelerometer sensor including a cantilever beam with the seismic mass as a proof mass measuring proper acceleration or g-force acceleration, a MEMS magnetometer, a magnetoresistive permalloy sensor, and a three-axis magnetometer.

11. The mobile automotive system according to claim 10, wherein the mobile telecommunications apparatus includes an integrated circuit having three-axis MEMS-based gyroscopes or a MEMS-based inertial measurement device that is configured to sense nine axes.

12. The mobile automotive system according to claim 1, wherein the exteroceptive sensors are configured to sense at least one of a distance to objects, an intensity of ambient light, and sound amplitude.

13. The mobile automotive system according to claim 1, wherein the proprioceptive sensors are configured to sense at least one of a motor speed, a wheel load, a heading, and a battery status of the motor vehicle.

14. The mobile automotive system according to claim 1, wherein the risk-transfer profiles are captured and categorized in the result list by the mobile automotive system, wherein the shadow requests are periodically transmitted to the plurality of automated risk-transfer supplier systems further based on at least one of the set of variable scoring parameters, the operating parameters, the environmental parameters, and wherein the result list is dynamically adapted in real-time and displayed to the user for selection.

15. The mobile automotive system according to claim 1, wherein the mobile automotive system automatically alerts the user if a more preferable risk-transfer profile is triggered in relation to a selected risk-transfer profile.

16. The mobile automotive system according to claim 1, wherein the result list is dynamically adapted in real-time and displayed to the user for selection based on definable categorization criteria including at least one of first payment parameters, duration structure, and risk-transfer structure.

17. The mobile automotive system according to claim 1, wherein the second risk transfer parameters and the correlated second payment transfer parameters are generated by an expert-system based circuit of the second risk-transfer system, wherein an occurred loss is at least partly covered by a second insurance system based on the second risk transfer parameters and correlated second payment transfer parameters.

18. The mobile automotive system according to claim 1, wherein transmitted automotive data includes at least simultaneous measured, time-dependent contextual and/or environmental data of the motor vehicle including at least measured weather condition parameters and/or location coordinate parameters.

19. The mobile automotive system according to claim 1, wherein the exteroceptive sensors include at least one of radar devices for monitoring surroundings of the motor vehicle, Light Imaging, Detection, And Ranging (LIDAR) devices for monitoring the surroundings of the motor vehicle, global positioning systems, vehicle tracking devices for measuring positioning parameters of the motor vehicle, odometrical devices for complementing and improving the positioning parameters measured by the global positioning systems, computer vision devices or video cameras for monitoring the surrounding of the motor vehicle, and ultrasonic sensors for measuring the position of objects close to the motor vehicle.

20. The mobile automotive system according to claim 1, wherein the mobile automotive system includes an aggregator for providing the risk exposure for one or a plurality of pooled risk-exposed motor vehicles based on the captured risk-related automotive data, wherein the first and/or second risk transfer parameters and the correlated first and second payment transfer parameters are dynamically generated based on the likelihood of occurrence of risk events of the pooled driving motor vehicles.

21. The mobile automotive system according to claim 20, wherein the aggregator automatically aggregates occurred and triggered losses using captured loss parameters of measured occurrence of risk events over all risk exposed motor vehicles within a predefined time period by incrementing an associated stored aggregated loss parameter and for automatically aggregating the received and stored first payment parameters over all risk exposed motor vehicles within a time period by incrementing an associated stored, aggregated payment parameter, and wherein the variable first and/or second risk transfer parameters and the correlated first and/or second payment transfer parameters dynamically are generated based upon the ratio of the aggregated loss parameter and the aggregated payment parameter.

22. The mobile automotive system according to claim 1, wherein the first risk-transfer system includes an automated first resource pooling system and the second risk-transfer system includes an automated second resource pooling system, wherein the risk-exposed motor vehicles are connected to the first resource pooling system by a plurality of payment transfer modules configured to receive and store first payments from the risk-exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by second payment transfer modules configured to receive and store the second payment parameters from the first risk-transfer system to adopt a portion of the risk exposures accumulated by the first risk-transfer system, and wherein, in case of an occurrence of one of defined risk events, the occurred loss is automatically covered by the automotive car system.

23. The mobile automotive system according to claim 1, wherein the mobile telecommunications apparatus includes additional triggers triggering accident notification and/or other added services based on the captured automotive data associated with the motor vehicles.

24. The mobile automotive system according to claim 1, wherein the mobile telecommunications apparatus provides one or more wireless connections by radio data system (RDS), a positioning system including a satellite receiving module, a mobile telephone interface including a digital radio service module, a language unit in communication with one of the RDS, the positioning system, and the cellular telephone interface.

25. The mobile automotive system according to claim 1, wherein the mobile telecommunication apparatus includes an interface for connecting with at least one of a data transmission bus of the motor vehicle and Controller Area Network (CAN) bus of the motor vehicle.

26. The mobile automotive system according to claim 1, wherein the mobile telecommunication apparatus includes memory for saving processor-driving operation code and flash memory for reading and capturing of the automotive data.

27. The mobile automotive system according to claim 1, wherein the mobile telecommunications apparatus is connected to an on-board diagnostic (OBD) system that monitors systems and/or subsystems of the motor vehicle.

28. The mobile automotive system according to claim 27, wherein the mobile telecommunications apparatus, connected to the OBD system of the motor vehicle, is connected by plugging in a data transmission wire into a port of the OBD system.

29. The mobile automotive system according to claim 1, wherein the mobile telecommunication apparatus is connected to an in-car interactive device, wherein a speed and travel distances of the motor vehicle are monitored by a global positioning system (GPS) circuit and wherein the automotive data is transmitted via the mobile telecommunication apparatus to the central automotive circuit by a cellular telecommunication connection.

* * * * *